United States Patent
Bowling et al.

(10) Patent No.: US 8,897,324 B2
(45) Date of Patent: Nov. 25, 2014

(54) TIMEBASE PERIPHERAL

(71) Applicant: Microchip Technology Incorporated, Chandler, AZ (US)

(72) Inventors: Stephen Bowling, Chandler, AZ (US); Brant Ivey, Maricopa, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 123 days.

(21) Appl. No.: 13/753,399

(22) Filed: Jan. 29, 2013

(65) Prior Publication Data

US 2013/0195124 A1    Aug. 1, 2013

Related U.S. Application Data

(60) Provisional application No. 61/593,527, filed on Feb. 1, 2012.

(51) Int. Cl.
*H04J 3/06* (2006.01)
*H04J 3/12* (2006.01)
*G06F 1/04* (2006.01)

(52) U.S. Cl.
CPC .... *H04J 3/06* (2013.01); *G06F 1/04* (2013.01)
USPC .......................................... 370/503; 370/522

(58) Field of Classification Search
None
See application file for complete search history.

(56) References Cited

U.S. PATENT DOCUMENTS

| | | | | |
|---|---|---|---|---|
| 5,418,932 A * | 5/1995 | Watabe et al. | ................. | 713/500 |
| 5,809,031 A * | 9/1998 | Horikawa et al. | ............. | 370/506 |
| 5,812,834 A | 9/1998 | Suzuki | ........................... | 713/502 |
| 7,145,831 B2 * | 12/2006 | Goller et al. | ................... | 365/154 |
| 7,180,332 B2 * | 2/2007 | Di Gregorio | ..................... | 326/96 |
| 2007/0172010 A1 | 7/2007 | Hilgendorf et al. | ........... | 375/371 |
| 2009/0184742 A1 | 7/2009 | Kris | .............................. | 327/160 |

OTHER PUBLICATIONS

International Search Report and Written Opinion, Application No. PCT/US2013/024004, 11 pages, Sep. 16, 2013.

* cited by examiner

*Primary Examiner* — Hong Cho
(74) *Attorney, Agent, or Firm* — King & Spalding L.L.P.

(57) ABSTRACT

A microcontroller has a timebase driven by a clock signal, wherein the timebase has a reset input and an output coupled with a comparator. The comparator is further coupled with a register and is operable to generate a synchronization output signal if the timebase matches the register value. The microcontroller further has a first multiplexer receiving the synchronization output signal from the comparator and further receiving at least one event signal generated by a unit other than the timebase, wherein the first multiplexer is operable to select either the synchronization output signal or the at least one event signal as a timebase synchronization output signal.

22 Claims, 3 Drawing Sheets

TIMEBASE PERIPHERAL

CROSS-REFERENCE TO RELATED APPLICATIONS

This application claims the benefit of U.S. Provisional Application No. 61/593,527 filed on Feb. 1, 2012, which is incorporated herein in its entirety.

TECHNICAL FIELD

The present disclosure relates to a time base peripheral, in particular, a time base peripheral with alternate synchronization and trigger output.

BACKGROUND

Microcontrollers are systems on a chip including a microprocessor, memory, oscillators and a plurality of peripheral devices. There are many microcontrollers available that practically do not require any external component to allow the microcontroller to function. The variety of peripherals integrated within a microcontroller need to be synchronized to a timebase. A timebase provides, for example, internal clock signals used by the peripherals. The timebase peripheral in a typical microcontroller has Input Capture and Output Compare modes. Typically, the timebase peripheral only generates synchronization/trigger events associated with the timebase period rollover as shown in FIG. 1. For example, in a microcontroller, a conventional 16-bit timebase peripheral 100 may have an external sync and trigger ability as shown in FIG. 1. In a Sync Mode, the signal sets a timebase period and in a trigger Mode, the signal starts a timebase, wherein a timebase period is derived from an internal register. The sync mode lets many timebases operate in parallel and the trigger mode allows delayed operation, for example, the timer is held in reset until a trigger is received. In these conventional embodiments, the sync/trigger output is the period match or rollover signal from timebase and is sent to all other timebases on the device as shown in FIG. 1.

A plurality of sync/trigger signals 170 are fed to a multiplexer 120. One of the input signals can be the output signal of comparator 140. The selected signal is fed to a sync and trigger control unit 130 which controls operation of a 16/32 bit timebase counter 110. Comparator 140 receives the count value from timebase counter 110 and the value of a period register 150 and generates a sync/trigger output signal 160 which can be fed to other peripheral devices.

SUMMARY

There exists a need for an improved timebase peripheral, in particular, to provide an apparatus and method that would allow users of the timebase peripheral to trigger an ADC conversion, time delay, or some other type of event concurrent with a qualified input capture event.

In summary, a microcontroller may comprise a timebase driven by a clock signal, wherein the timebase comprises a reset input and an output coupled with a comparator, wherein the comparator is further coupled with a register and generates an output signal if the timebase matches the register value; further comprising a first multiplexer receiving an output of the comparator and further receiving at least one event signal generated by a unit other than the timebase.

According to an embodiment, the microcontroller may further comprise another comparator coupled with the timebase and another register, wherein an output of the comparator is coupled with an input of the first multiplexer. According to a further embodiment, the microcontroller may further comprise an input capture logic generating an input capture event signal fed to another input of the first multiplexer. According to a further embodiment, the microcontroller may further comprise an output compare logic generating an output compare event signal fed to another input of the first multiplexer. According to a further embodiment, the first multiplexer can be controlled by a control register. According to a further embodiment, the microcontroller may further comprise a second multiplexer receiving the output signal of the comparator and a plurality of sync/trigger source signals, wherein an output of the second multiplexer is coupled with the reset and trigger input logic of the timebase.

According to an exemplary embodiment, a microcontroller comprises a timebase driven by a clock signal, wherein the timebase comprises a reset input and an output coupled with a comparator, wherein the comparator is further coupled with a register and is operable to generate a synchronization output signal if the timebase matches the register value. The microcontroller further comprises a first multiplexer receiving the synchronization output signal from the comparator and further receiving at least one event signal generated by a unit other than the timebase, wherein the first multiplexer is operable to select either the synchronization output signal or the at least one event signal as a timebase synchronization output signal.

According to a further embodiment, the microcontroller may further comprise another comparator coupled with the timebase and another register, wherein an output of the comparator is coupled with a further input of the first multiplexer. According to a further embodiment, the microcontroller may further comprise an input capture logic generating an input capture event signal fed to another input of the first multiplexer. According to a further embodiment, the microcontroller may further comprise an output compare logic generating an output compare event signal fed to another input of the first multiplexer. According to a further embodiment, the first multiplexer can be controlled by a control register. According to a further embodiment, the microcontroller may further comprise a second multiplexer receiving the output signal of the first multiplexer and a plurality of sync/trigger source signals, wherein an output of the second multiplexer is coupled with the reset input of the timebase. According to a further embodiment, the microcontroller may further comprise a second multiplexer receiving the output signal of the comparator and a plurality of sync/trigger source signals, wherein an output of the second multiplexer is coupled with the reset input of the timebase. According to a further embodiment, the second multiplexer may furthermore receive the output signal of the first multiplexer. According to a further embodiment, the timebase can be operable to operate in a synchronization mode and a trigger mode. According to a further embodiment, the clock signal can be selected from the system clock and at least one other clock source. According to a further embodiment, the at least one other clock source can be an internal or external clock source asynchronous to the system clock.

According to another embodiment, a method for providing a synchronization or trigger signal within a microcontroller may comprise the steps of operating a timebase driven by a clock signal, wherein the timebase comprises a reset input and an output coupled with a comparator, wherein the comparator is further coupled with a register and is operable to generate a synchronization output signal if the timebase matches the register value; receiving at least one event signal generated by a unit other than the timebase; selecting by a first multiplexer either the synchronization output signal or the at least one event signal and feeding the selected signal as a timebase synchronization output signal to a plurality of peripheral units integrated in the microcontroller.

According to a further embodiment, the method may further comprise generating by another comparator coupled with the timebase and another register another synchronization output signal, wherein the first multiplexer can select another synchronization output signal as the timebase synchronization output signal. According to a further embodiment of the method, the at least one event signal can be generated by an input capture logic. According to a further embodiment of the method, the at least one event signal can be generated by an output compare logic. According to a further embodiment of the method, the at least one event signal can be generated by an analog comparator unit. According to a further embodiment of the method, a timebase counter can be reset by a signal selected by means of a second multiplexer receiving the output signal of the first multiplexer and a plurality of sync/trigger source signals. According to a further embodiment of the method, the second multiplexer may receive the output signal of the comparator. According to a further embodiment of the method, the timebase can be programmed to operate in a synchronization mode or a trigger mode. According to a further embodiment of the method, in a synchronization mode, a timebase counter can be reset to an synchronization input signal. According to a further embodiment of the method, in a trigger mode, a timebase counter can be started to according to an input signal. According to a further embodiment of the method, the clock signal can be selected from the system clock and at least one other clock source, wherein the at least one other clock source is an internal or external clock source asynchronous to the system clock.

DETAILED DESCRIPTION

According to various embodiments, a synchronization/trigger event output can be associated with an Input Capture edge event or an Output Compare edge event. The synchronization/trigger output can be used to start other timebases, start ADC conversions, start or stop capacitive-time measurements, etc. Hence, a wide variety of control functions within a microcontroller can be triggered or synchronized.

The various embodiments, thus, concern a timebase peripheral with selectable output event signals which may be used to synchronize other time bases and trigger other peripheral events. These features give a user more flexibility to configure event timing in their end application. More complex interactions can be setup between peripherals to solve the application timing and measurement requirements.

Figure 2:
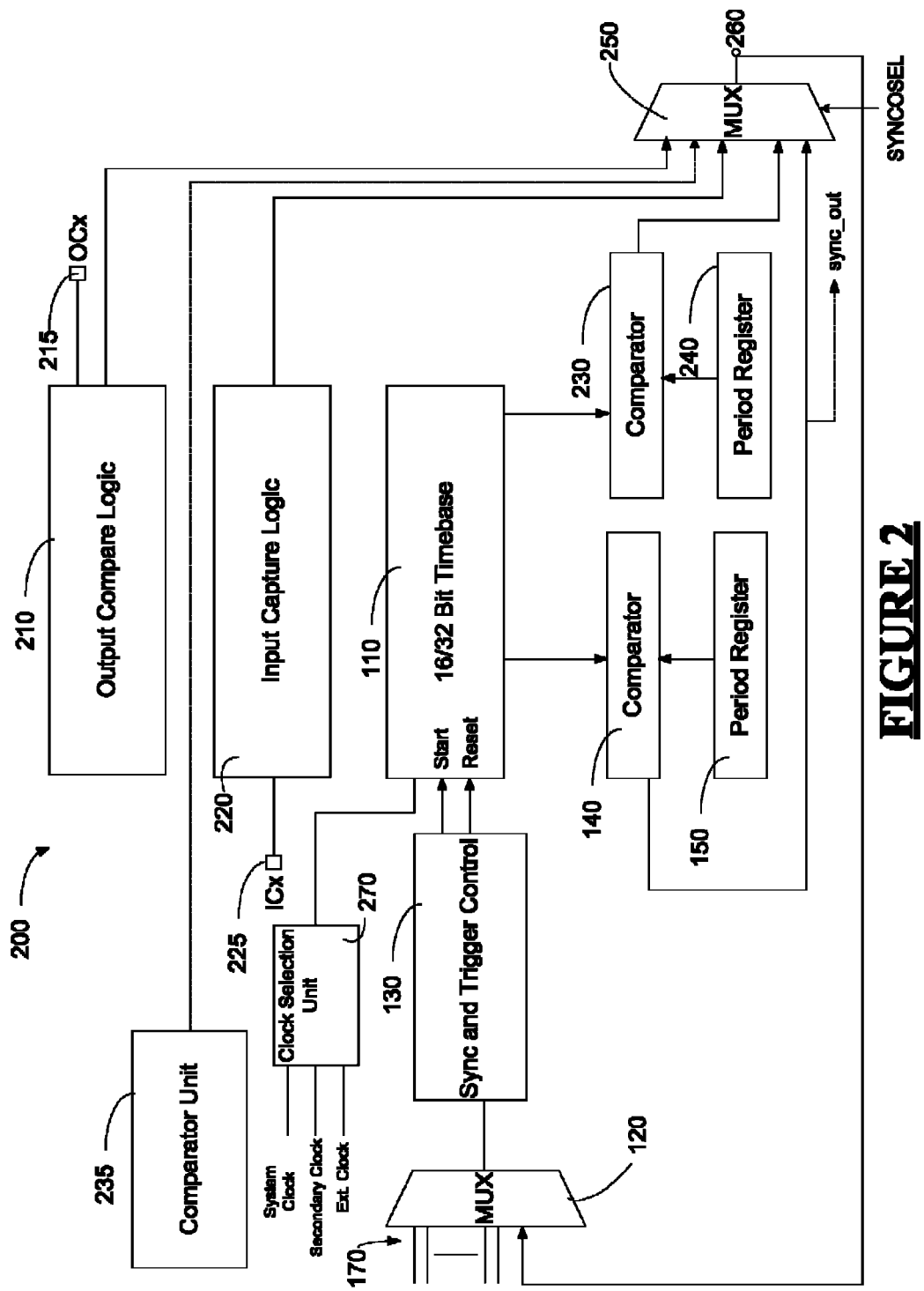
FIG. 2 shows an embodiment of an improved timebase and sync/trigger output.

As shown in FIG. 2, the timebase peripheral 200 has an input multiplexer 120 that selects an internal signal, for example, output signal of comparator 140, or an external signal from a plurality of external signals to be used as a synchronization or a trigger source for the timebase. In alternative embodiments, more than one internal signal may be selectable through multiplexer 120. A synchronization signal selected by the multiplexer 120 will determine when the timer counter of 16/32 bit timebase 110 should reset to 0, therefore setting the period of the timer. A trigger signal will determine when the counter 110 will start counting. Sync and trigger control unit 130 is used to generate these control signals from the selected signal. Timebase counter 110 is driven by an internal clock signal which can be the system clock or a selectable clock signal derived from the system clock or any other internal or external clock source.

In the trigger mode, the timer period is generally set internally, for example by resetting the timebase 110. A sync_out signal is produced, for example, by the comparator 140 and can be used by other modules as a sync source or a trigger source as indicated by the dotted line. This sync_out signal is typically the internally generated sync signal from the timer and generated when the timer reaches the value stored in period register 150. By means of the SYNCOSEL signal, an alternate sync_out signal is selected through multiplexer 250. This signal may be an input capture event signal if operating in Input Capture mode by means of unit 220, or a compare match signal if operating in Output Compare mode by means of unit 210. The alternate sync_out signal provides additional timing references that are related to module events.

Output compare logic unit 210 is operable to compare digital values, for example from a different timer unit or from a digital input port and generate an output signal upon a match which may also be fed to an external pin 215. In addition, this signal can be fed separately to an input of multiplexer 250. In addition, an input capture logic 220 may be present that comprises for example at least one latch coupled with one or more external pins 225. The input capture logic may be designed to capture an external or internal digital signal when triggered and generate a respective output logic signal. The output logic signal generated by input capture unit 220 is also fed to another input of multiplexer 250.

In addition, timebase 110 can be programmably operated from the system clock or any other clock source. To this end, a clock selection unit 270 is added which can select one of a plurality of clock sources. For example, clock selection unit 270 may select the system clock to operate synchronously with the CPU. However, other asynchronous clock sources may be selected such as a secondary clock or an external clock as indicated in FIG. 2 with the various clock input signals provided to clock selection unit 130. The asynchronous clock option allows the peripheral to operate from a clock source that is not necessarily the system clock source or a clock derived from the system clock. This enables the peripheral to continue operation and to trigger various hardware events whether the CPU and its clock source operates or not. Therefore, the peripheral can receiving the output signal from timebase 110 can complete various tasks independent of the CPU operation which may lower operating power. To ensure proper functioning in timer mode, a synchronized timer mode may be necessary. Such a mode may require that the synchronizing source selected by multiplexer 120 is to be clocked from the same source as selected by clock selection unit 270. By ensuring this, the timebase 110 and trigger source are synchronized. This may be in particular important if an external source is selected. However, both the external source and the timebase 110 can operate from a clock source that is synchronous or asynchronous to the system clock.

As shown in FIG. 2, a second set of comparator 230 and associated period register 240 may be provided wherein the output of comparator 230 is coupled with a further input of multiplexer 250. Multiplexer 250 is controlled by signal SYNCOSEL which may be a two-bit signal using for example two signal lines. Depending on the number of selectable sync/trigger signals more control lines may be necessary to control multiplexer 250. For example, as shown in FIG. 2, another peripheral logic unit 235 may be provided which would require a further control line for multiplexer 250. As an example, an analog comparator unit 235 may compare analog values and generate an output signal when a predefined threshold such as an internal or external reference voltage is exceeded. Instead of analog comparator unit 235 or in addition to it, a further digital comparator or event generator unit may be present to further supply additional digital events from within the microcontroller. The integrated analog comparator can then generate a trigger signal which can also be fed to multiplexer 250.

Figure 1:
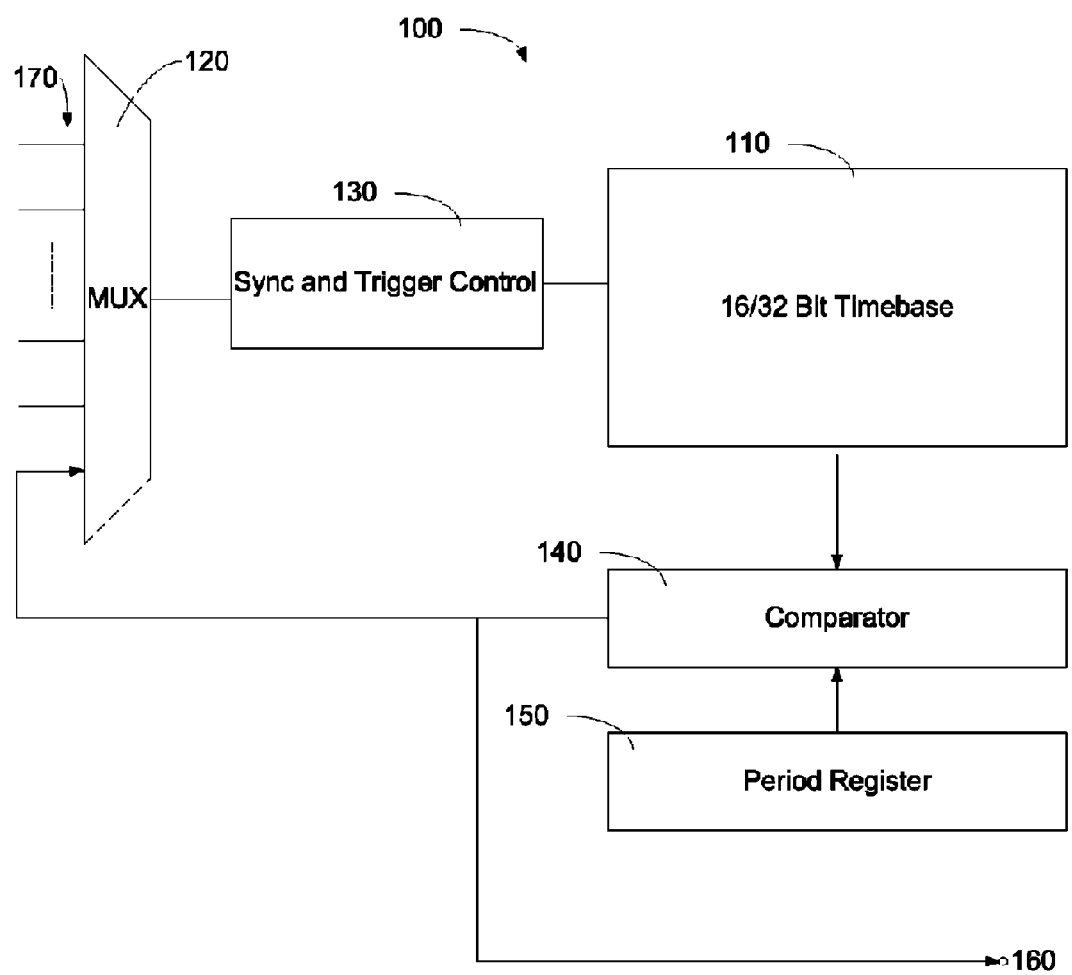
FIG. 1 shows a conventional timebase with sync/trigger output.

The timebase period match/reset event is the only event that would typically be used to synchronize or trigger other timebase peripherals in conventional systems as shown in FIG. 1. The embodiment shown in FIG. 2 is already enhanced by allowing to select between two different period values by means of the two sets of comparator and period registers 140/150 and 230/240. The timebase peripheral according to various embodiments further combines multiple functions and operating modes in a single module. Therefore, other event types are available for use outside the module, especially for triggering non-timebase functions.

According to various embodiments, these other signals can be assigned to the sync/trigger output 260. Thus, an alternate output signal, for example, depends on timebase functions available within the peripheral. In a timer mode, this can be a trigger register event as for example provided by timebase 110 and comparator/period registers 140/150 and 230/240. In an output compare mode, this can be an output compare event provided by unit 210. In an input compare mode, this can be a logic signal generated by an analog comparator as indicated by unit 220. In an input capture mode, this can be an input capture event signal as indicated by the input capture unit 225. Other signals may be used by means of the appropriately designed multiplexer 250 as shown in FIG. 2.

The various embodiments simplify the device-level routing. Peripherals connected to the sync/trigger bus 260 have now access to more signals. This provides much greater timing flexibility. For example, the following functionalities can be implemented according to various embodiments:

Zero capture timebase after capture event

Provide variable offset of slaved timebase using Trigger register instead of Period register Trigger ADC/DAC on Input Capture event Trigger ADC/DAC on Output Compare event Provide trigger signals for a charge time measurement unit (CTMU)

Schedule a one-shot delay from Input Capture event, Output Compare edge event, or Trigger register event Users may develop many other uses to automate peripheral interaction.

Figure 3:
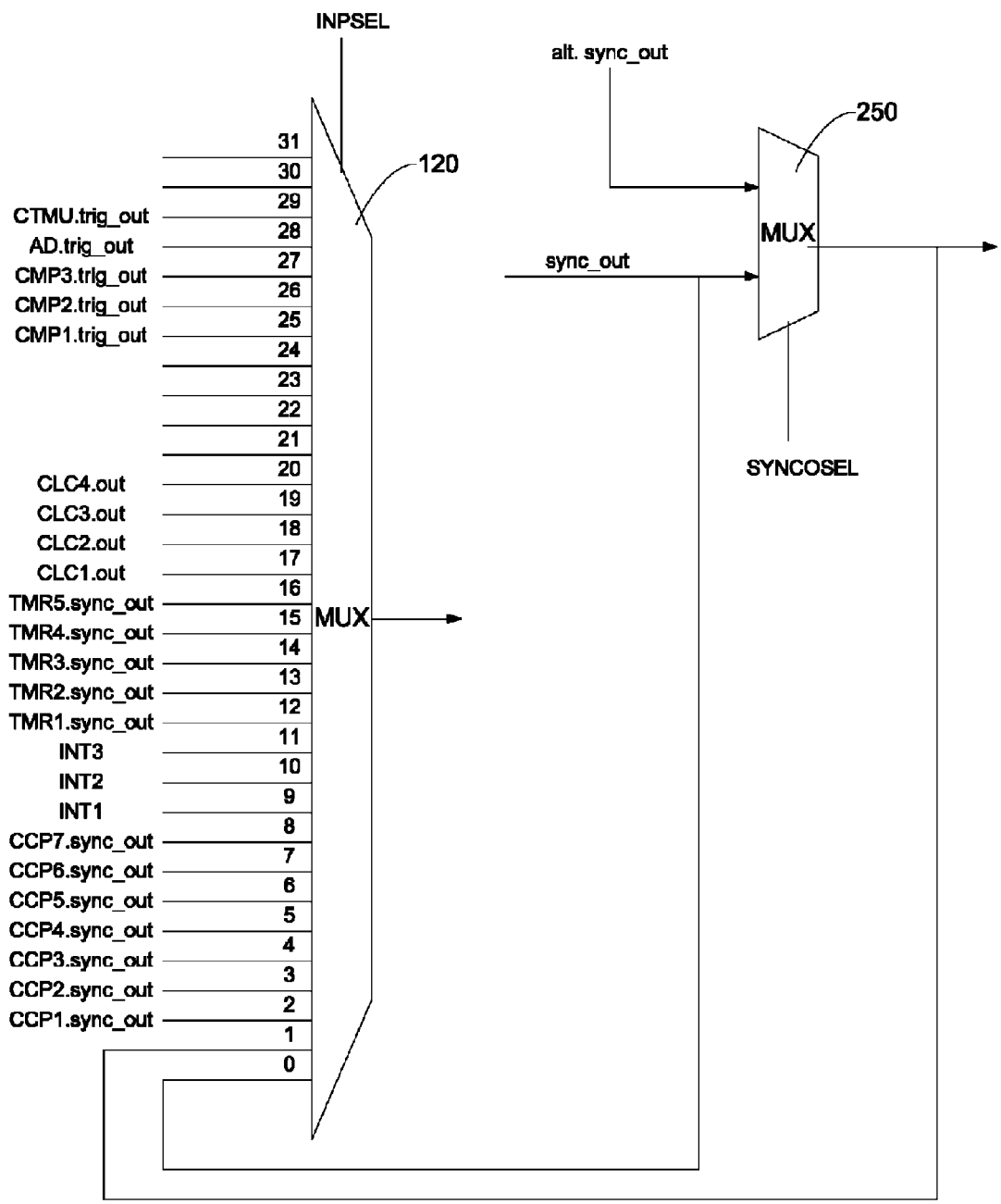
FIG. 3 shows yet another embodiment of a sync/trigger output.

FIG. 3 shows an exemplary embodiment of an input selection unit. Here, multiplexer 120 has 32 input signals and multiplexer 250 can select between two sync_out signals. The sync_out signal is fed to a first input '0' and the output of multiplexer 250 to a second input '1'. The next 7 inputs are populated by synchronization signals generated by a capture/compare unit. The next three inputs are interrupt signals and the following 5 input signals are timer synchronization signals. The following four signals are provided by a configurable logic cell (CLC) unit. Thus, the aforementioned signals populate inputs '0-20' of multiplexer 120. Here, the next four inputs are reserved and inputs '25-27' are populated by three comparator signals, input '28' by the AD converter trigger signal and input '29' by the trigger signal from the capacitor time measurement unit. The last two inputs '30' and '31' are reserved, in this embodiment, multiplexer 250 only receives two input signals, namely the sync_out signal from the respective timebase unit and a second signal which might be provided by a further multiplexer. Thus, the second signal can be seen as an alternative sync_out signal. Hence, only a single bit SYNCOSEL is needed to control multiplexer 250.

Thus, FIG. 3 shows a possible implementation of synchronization and trigger inputs. At a minimum, the synchronization outputs of all other timebase peripherals on the device should be made available to the module for the purpose of timebase synchronization. This includes all other MCCP/SCCP modules and discrete timers, if available. The other non-timebase inputs will be used as trigger sources for the module. Any external source that might need to create a pulse event or time delay could be connected as a trigger input. These include external interrupt pins, comparator outputs, AOC conversion events, etc. The CLC outputs provide access to a wider selection of trigger sources and also allow the user to set up complex trigger events.

What is claimed is:

1. A microcontroller comprising a timebase driven by a clock signal, wherein the timebase comprises a reset input and an output coupled with a comparator, wherein the comparator is further coupled with a register and is operable to generate a synchronization output signal if the timebase matches the register value; further comprising a first multiplexer receiving the synchronization output signal from the comparator and further receiving at least one event signal generated by a unit other than the timebase, wherein the first multiplexer is operable to select either the synchronization output signal or the at least one event signal as a timebase synchronization output signal.

2. The microcontroller according to claim 1, further comprising another comparator coupled with the timebase and another register, wherein an output of the comparator is coupled with a further input of the first multiplexer.

3. The microcontroller according to claim 1, further comprising an input capture logic generating an input capture event signal fed to another input of the first multiplexer.

4. The microcontroller according to claim 1, further comprising an output compare logic generating an output compare event signal fed to another input of the first multiplexer.

5. The microcontroller according to claim 1, wherein the first multiplexer is controlled by a control register.

6. The microcontroller according to claim 1, further comprising a second multiplexer receiving the output signal of said first multiplexer and a plurality of sync/trigger source signals, wherein an output of the second multiplexer is coupled with the reset input of the timebase.

7. The microcontroller according to claim 1, further comprising a second multiplexer receiving the output signal of said comparator and a plurality of sync/trigger source signals, wherein an output of the second multiplexer is coupled with the reset input of the timebase.

8. The microcontroller according to claim 7, wherein the second multiplexer furthermore receives the output signal of the first multiplexer.

9. The microcontroller according to claim 1, wherein the timebase is operable to operate in a synchronization mode and a trigger mode.

10. The microcontroller according to claim 1, wherein the clock signal can be selected from the system clock and at least one other clock source.

11. The microcontroller according to claim 10, wherein the at least one other clock source is an internal or external clock source asynchronous to the system clock.

12. A method for providing a synchronization or trigger signal within a microcontroller comprising the steps of:
  operating a timebase driven by a clock signal, wherein the timebase comprises a reset input and an output coupled with a comparator, wherein the comparator is further coupled with a register and is operable to generate a synchronization output signal if the timebase matches the register value;
  receiving at least one event signal generated by a unit other than the timebase,
  selecting by a first multiplexer either the synchronization output signal or the at least one event signal and feeding the selected signal as a timebase synchronization output signal to a plurality of peripheral units integrated in said microcontroller.

13. The method according to claim 12, further comprising generating by another comparator coupled with the timebase and another register another synchronization output signal, wherein the first multiplexer can select the another synchronization output signal as the timebase synchronization output signal.

14. The method according to claim 12, wherein the at least one event signal is generated by an input capture logic.

15. The method according to claim 12, wherein the at least one event signal is generated by an output compare logic.

16. The method according to claim 12, wherein the at least one event signal is generated by an analog comparator unit.

17. The method according to claim 12, wherein a timebase counter is reset by a signal selected by means of a second multiplexer receiving the output signal of said first multiplexer and a plurality of sync/trigger source signals.

18. The method according to claim 17, wherein the second multiplexer receives the output signal of said comparator.

19. The method according to claim 12, wherein the timebase is programmed to operate in a synchronization mode or a trigger mode.

20. The method according to claim 19, wherein in a synchronization mode, a timebase counter is reset to an synchronization input signal.

21. The method according to claim 19, wherein in a trigger mode, a timebase counter is started to according to an input signal.

22. The method according to claim 12, wherein the clock signal can be selected from the system clock and at least one other clock source, wherein the at least one other clock source is an internal or external clock source asynchronous to the system clock.

* * * * *